United States Patent
Hatfield et al.

(10) Patent No.: US 12,019,248 B1
(45) Date of Patent: Jun. 25, 2024

(54) ADJUSTABLE HEAD SECUREMENT FOR HEAD-MOUNTABLE DEVICE

(71) Applicant: Apple Inc., Cupertino, CA (US)

(72) Inventors: Dustin A. Hatfield, Campbell, CA (US); Geng Luo, Santa Clara, CA (US); Benjamin A. Shaffer, San Jose, CA (US); Julian Jaede, San Francisco, CA (US); Nicolas Lylyk, Sunnyvale, CA (US); Paul X. Wang, Cupertino, CA (US); Trevor J. Ness, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/402,386

(22) Filed: Aug. 13, 2021

Related U.S. Application Data

(60) Provisional application No. 63/078,815, filed on Sep. 15, 2020.

(51) Int. Cl.
*G02B 27/01* (2006.01)

(52) U.S. Cl.
CPC .. *G02B 27/0176* (2013.01); *G02B 2027/0154* (2013.01)

(58) Field of Classification Search
CPC ..................... G02B 27/0176; G02B 2027/0154
See application file for complete search history.

(56) References Cited

U.S. PATENT DOCUMENTS

| | | | |
|---|---|---|---|
| 5,940,890 A * | 8/1999 | Dallas | A42B 3/185 2/421 |
| 8,643,568 B2 | 2/2014 | West et al. | |
| 8,907,865 B2 | 12/2014 | Miyawaki | |
| 9,703,103 B2 | 7/2017 | Araki et al. | |
| 9,710,057 B2 | 7/2017 | Mikhailov et al. | |
| 9,927,617 B2 | 3/2018 | Morimoto | |
| 10,321,751 B1 * | 6/2019 | Magrath | G06F 1/1686 |
| 2003/0115662 A1 * | 6/2003 | Dobbie | G02B 27/0176 348/E5.09 |
| 2011/0113536 A1 * | 5/2011 | Weisel | A42B 3/185 2/10 |
| 2011/0273662 A1 * | 11/2011 | Hwang | G02B 27/0176 351/158 |
| 2017/0103573 A1 * | 4/2017 | Drinkwater | G02B 27/0176 |
| 2017/0273390 A1 * | 9/2017 | Maloney | A42B 3/142 |
| 2018/0295733 A1 * | 10/2018 | Wen | H05K 5/0086 |
| 2019/0369659 A1 * | 12/2019 | Hu | G02B 27/0176 |
| 2021/0356750 A1 * | 11/2021 | Shin | G02B 27/0172 |

* cited by examiner

*Primary Examiner* — William Boddie
*Assistant Examiner* — Bipin Gyawali
(74) *Attorney, Agent, or Firm* — BAKERHOSTETLER

(57) ABSTRACT

Systems of the present disclosure can provide a head-mountable device with a head securement element that allows a user to adjust both the magnitude, location, and direction of forces applied to the face of the user. Examples of adjustment mechanisms described herein allow a user to control the tilt of the head-mountable device relative to a head securement element, as well as the tightness of the head securement element. Accordingly, the user can select a fit that distributes forces widely, maximizes comfort, allows the user to enjoy the head-mountable device for longer durations of time.

13 Claims, 10 Drawing Sheets

ADJUSTABLE HEAD SECUREMENT FOR HEAD-MOUNTABLE DEVICE

CROSS-REFERENCE TO RELATED APPLICATION

This application claims the benefit of U.S. Provisional Application No. 63/078,815, entitled "ADJUSTABLE HEAD SECUREMENT FOR HEAD-MOUNTABLE DEVICE," filed Sep. 15, 2020, the entirety of which is incorporated herein by reference.

TECHNICAL FIELD

The present description relates generally to head-mountable devices, and, more particularly, to adjustable head securement mechanisms for securing a head-mountable devices to a head of a user.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
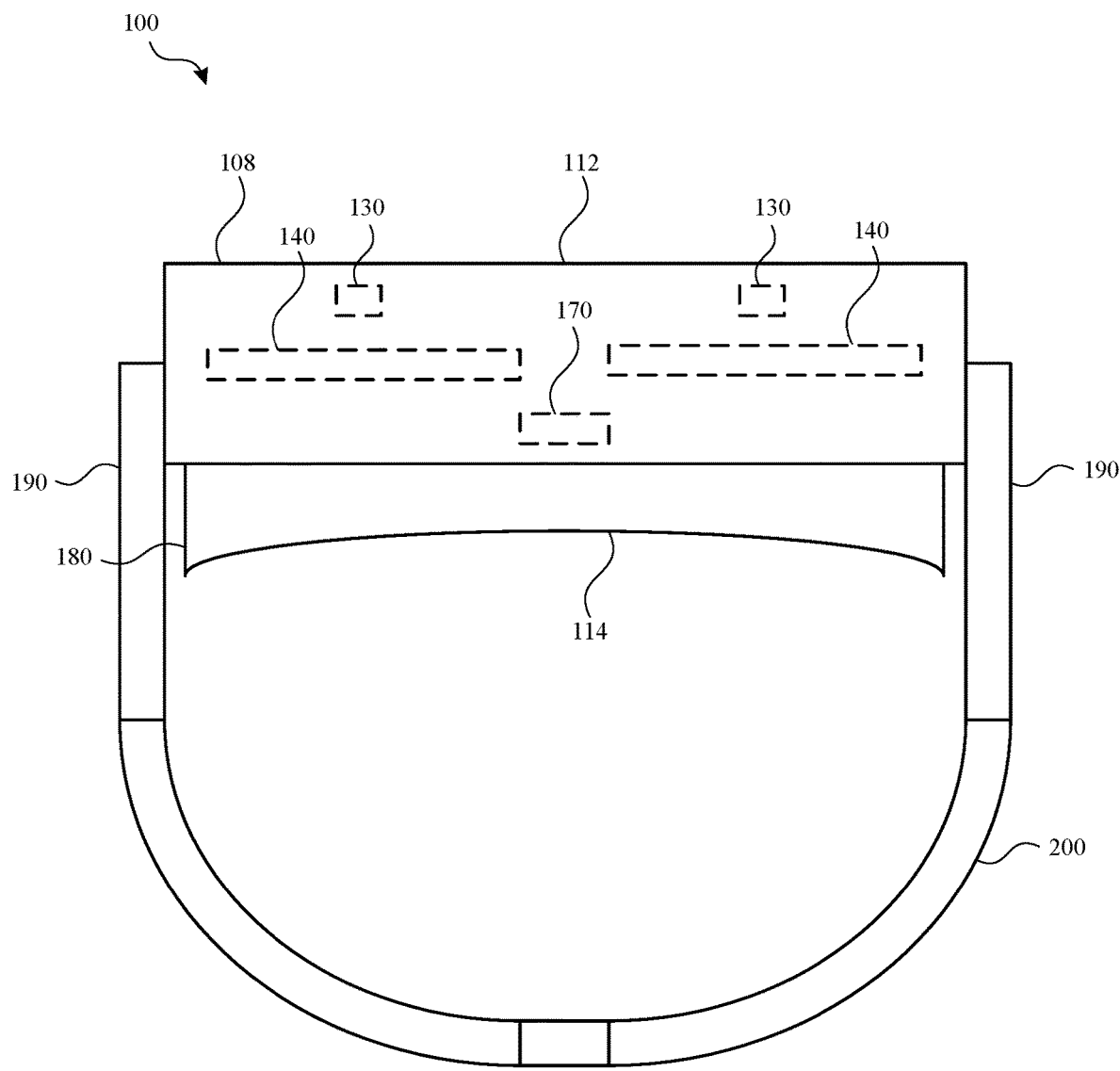
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

A head-mountable device can be secured to a head of a user while being worn and operated by the user. It can be desirable to maximize the fit and comfort on the user, so that usage of the head-mountable device for extended durations is not difficult for the user.

Some head-mountable devices are designed to secure to the head of the user by wrapping tightly around the back of the user's head, for example, with a band. This arrangement often involves providing a tightness that can secure the head-mountable device to a variety of head shapes and sizes. However, this can be somewhat uncomfortable for at least some users. Another arrangement can allow the user to adjust the head securement mechanism to achieve the desired fit, however such adjustments are often provided in only one direction. For example, many adjustment mechanisms allow the user to control only the magnitude of a total force applied to the user's face. Such forces may be unevenly distributed or focused in specific regions, which can cause the user to incur fatigue.

To maximize comfort experienced by the user, a head-mountable device can provide one or more different types of adjustment capabilities. Such adjustments can help the forces be distributed evenly across the face. For example, rather than allowing excessive forces to weigh on the cheeks and/or nose of the user, adjustments can be made to distribute forces along the forehead of the user and/or other regions. Such adjustment capabilities can help distribute forces and accommodate variations in facial features (e.g., face plane slope, forehead size, eye location) across different users.

It can be desirable to provide a head securement element that allows a user to adjust both the magnitude, location, and direction of forces applied to the face of the user. Examples of adjustment mechanisms described herein allow a user to control the tilt of the head-mountable device relative to a head securement element, as well as the tightness of the head securement element. Accordingly, the user can select a fit that distributes forces widely, maximizes comfort, allows the user to enjoy the head-mountable device for longer durations of time.

These and other embodiments are discussed below with reference to FIGS. 1-14. However, those skilled in the art will readily appreciate that the detailed description given herein with respect to these Figures is for explanatory purposes only and should not be construed as limiting.

As shown in FIG. 1, a head-mountable device 100 can include an HMD module 110, a face engagement module 180, and a head securement element 200. The HMD module 110 can include a frame 108 that is worn on a head of a user. The frame 108 can be positioned in front of the eyes of a user to provide information within a field of view of the user. The HMD module 110 and/or the face engagement module 180 can provide a nosepiece to rest on a user's nose.

The frame 108 can provide structure around a peripheral region thereof to support any internal components of the HMD module 110 in their assembled position. For example, the frame 108 can enclose and support various internal components (including for example integrated circuit chips, processors, memory devices and other circuitry) to provide computing and functional operations for the head-mountable device 100, as discussed further herein. While several components are shown within the frame 108 of the HMD module 110, it will be understood that some or all of these components can be located anywhere within or on the head-mountable device 100. For example, one or more of these components can be positioned within the face engagement module 180, the arms 190, and/or the head securement element 200 of the head-mountable device 100.

The frame 108 can include and/or support one or more camera modules 130. The camera modules 130 can be positioned on or near an outer side 112 of the frame 108 to capture images of views external to the head-mountable device 100. As used herein, an outer side of a portion of a head-mountable device is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 100 can include display elements 140 that provide visual output for viewing by a user wearing the head-mountable device 100. One or more display elements 140 can be positioned on or near an inner side 114 of the frame 108. As used herein, an inner side 114 of a portion of a head-mountable device 100 is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set and/or changed based on an interpupillary distance ("IPD") of the user. IPD is defined as the distance between the centers of the pupils of a user's eyes.

The HMD module 110 and/or the face engagement module 180 can include a sensor 170. The sensor 170 can be positioned and arranged to detect a characteristic of the user, such as facial features. For example, such a user sensor can perform facial feature detection, facial movement detection, facial recognition, eye tracking, user mood detection, user emotion detection, voice detection, and the like.

The face engagement module 180 can define an interior space through which light can pass, thereby providing to the user wearing the head-mountable device a view of a display element of the HMD module 110. Such a view can be enhanced by preventing the ingress of light from the external environment and into the face engagement module 180. To provide an effective face engagement, a comfortable fit, and proper alignment of the HMD module 110, the face engagement module 180 can be customized and/or selected for a particular user. As such, a given HMD module 110 can be used with various users where each user is provided with an appropriate face engagement module 180 that provides the desired fit.

While the face engagement module 180 is shown schematically with a particular size and shape, it will be understood that the size and shape of the face engagement module 180, particularly at the inner side 114 of the face engagement module 180, can have a size and shape that accommodates the face of a user wearing the head-mountable device 100. For example, the inner side 114 can provide a shape that generally matches the contours of the user's face around the eyes of the user. The inner side 114 can be provided with one or more features that allow the face engagement module 180 to conform to the face of the user to enhance comfort and block light from entering the face engagement module 180 at the point of contact with the face. For example, the inner side 214 can provide a flexible, soft, elastic, and/or compliant structure.

As further shown in FIG. 1, the head-mountable device 100 can include arms 190 on opposing sides of the HMD module 110. For example, the HMD module 110 can include or be coupled to arms 190 that extend from and/or are integrally formed with the frame 108. The arms 190 and the frame 108 can form a continuous, rigid structure. It will be understood that the arms 190 can optimally be a portion of the frame 108 or another component of the HMD module 110. Optionally, a portion of each of the arms 190 can be pivotably coupled to the HMD module 110 of the head-mountable device 100 for collapsing into a stowed configuration.

The head securement element 200 can further include a band for extending to and/or about a rear side of the head of the user, as described further herein. The band can optionally extend from ends of the arms 190. The band can be stretchable to comfortably provide tension about the head of the user. For example, the band can include fabric, elastic, polymers, woven materials, braided materials, and the like.

While the head securement element 200 is illustrated as being connected to the HMD module 110 (e.g., via the arms 190) rather than the face engagement module 180, it will be understood the head securement element 200 may be connected to the HMD module 110 via the face engagement module 180. In such an example, the head securement element 200 can be primarily or exclusively secured to an HMD module 110 via a face engagement module 180. By providing the head securement element 200 with a face engagement module 180, both head securement and face engagement can be customized or otherwise selected for achieving the desired fit for a given user. It will be further understood that the head securement element 200 can optionally be directly connected to both the HMD module 110 (e.g., at the arms 190) and the face engagement module 180.

The HMD module 110 and/or the face engagement module 180 can be supported on a user's head with a head securement element 200. The head securement element 200 can wrap or extend along opposing sides of a user's head and/or to a rear of the user's head. The head securement element 200 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100.

Figure 2:
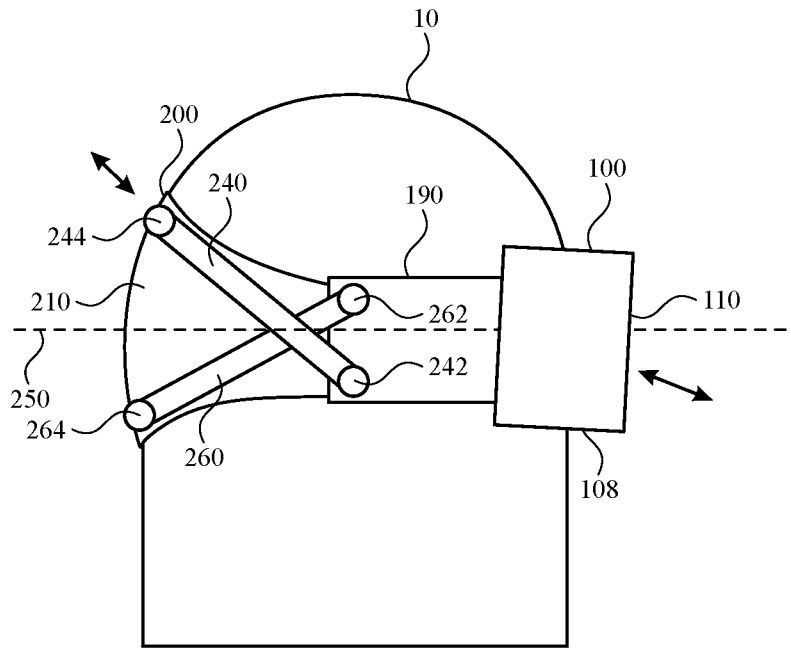
FIG. 2 illustrates a side view of a head-mountable device on a head of a user, according to some embodiments of the present disclosure.
Figure 3:
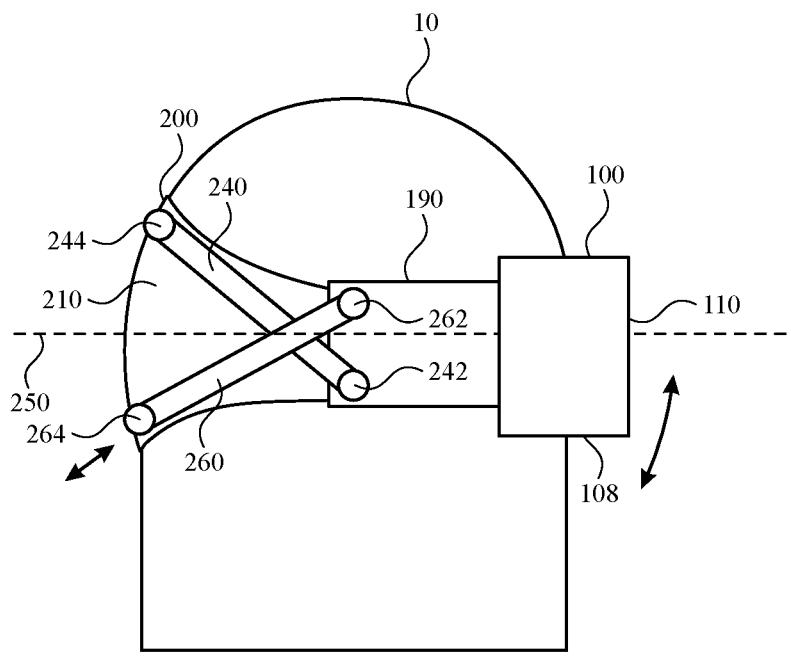
FIG. 3 illustrates a side view of the head-mountable device of FIG. 2 on the head of the user, according to some embodiments of the present disclosure.

Referring now to FIGS. 2 and 3, a head-mountable device can be provided with a head securement element with different types of adjust ability to control both the magnitude of forces applied to the face of the user as well as the tilt of the head-mountable device for controlling the distribution of the forces evenly across the face of the user.

As shown in FIG. 2, the HMD module 110 of the head-mountable device 100 can include the frame 108 and arms 190 that extend from the frame 108. The arms 190 can be rigidly coupled to the frame 108, such that a relative orientation of the arms 190 and the frame 108 remains fixed.

The head securement element 200 of the head-mountable device 100 can include multiple straps (e.g., support strap 240 and/or tilt strap 260), each having their own adjustment capability so that different types of adjustments can be independently controlled. Each of the straps can couple to different locations of the HMD module 110 and extend about different regions of the head 10 of the user.

As shown in FIG. 2, a support strap 240 can extend from the HMD module 110 and extend about an upper portion of the head 10 of the user. While the support strap 240 is shown extending from the arm 190, it will be understood that the support strap 240 can extend from the frame 108 or another portion of the HMD module 110.

The support strap 240 can include support strap engagement elements 242 that are coupled to the HMD module 110 (e.g., at the arms 190, the frame 108, etc.) at corresponding first locations. The support strap 240 can extend from and/or between each of the support strap engagement elements 242. The support strap engagement elements 242 can optionally facilitate movement and/or rotation of the support strap 240 relative to the HMD module 110, as described further herein.

The support strap 240 can include a support strap tensioning element 244 configured to adjust tension in the support strap 240. For example, the support strap tensioning element 244 can be operated to alter an effective length of the support strap 240 (e.g., the length between the support strap engagement elements 242). Such adjustments can be manual (e.g., by the user) and/or automated (e.g., controlled by the HMD module 110).

In some examples, a tensioning element be a coupling mechanism between different portions of the corresponding strap, where an amount of overlap or portions coupled together can be altered to adjust the effective length of the total strap. Corresponding engagement elements can be provided, such as hook and loop fasteners, buckles, magnets, pins, holes, buttons, rack and pinion mechanisms, dials, and the like. In other examples, a tensioning element can be a physical apparatus such as a motor, electromagnetic coil, or solenoid that can be actuated to cause tension (either directly or indirectly) to be applied to, or relieved form, the strap. In some examples, a tensioning element can be an analog, digital, or integrated circuit configured to apply an electrical signal to cause tension (either directly or indirectly) to be applied to, or relieved form, the corresponding strap.

The support strap tensioning element 244 can be operated to adjust the tension in the support strap 240. When tension is increased, the HMD module 110 can be pulled toward the face of the user. While the force of gravity can pull the HMD module 110 downward onto the nose and cheeks of the user, the support strap 240 can provide opposing forces that include at least an upward component. The tension in the support strap 240 can be decreased to reduce the total forces applied to the face of the user.

As shown in FIG. 3, a tilt strap 260 can extend from the HMD module 110 and extend about a lower portion of the head 10 of the user. While the tilt strap 260 is shown extending from the arm 190, it will be understood that the tilt strap 260 can extend from the frame 108 or another portion of the HMD module 110.

The tilt strap 260 can include tilt strap engagement elements 262 that are coupled to the HMD module 110 (e.g., at the arms 190, the frame 108, etc.) at corresponding second locations. The second locations can be different than the first locations at which the support strap engagement elements 242 are positioned. The tilt strap 260 can extend from and/or between each of the tilt strap engagement elements 262. The tilt strap engagement elements 262 can optionally facilitate movement and/or rotation of the tilt strap 260 relative to the HMD module 110, as described further herein.

The tilt strap 260 can include a tilt strap tensioning element 264 configured to adjust tension in the tilt strap 260. The tilt strap tensioning element 264 can inlcude one or more of the mechanisms described herein with respect to the support strap tensioning element 244. The tilt strap tensioning element 264 can be operated to alter an effective length of the tilt strap 260 (e.g., the length between the tilt strap engagement elements 262). Such adjustments can be manual (e.g., by the user) and/or automated (e.g., controlled by the HMD module 110).

The tilt strap tensioning element 264 can be operated to adjust the tension in the tilt strap 260. When tension is increased, the HMD module 110 can be tilted (e.g., rotated) about a fulcrum, such as regions of the user's face (e.g., nose and cheeks) on which the HMD module 110 rests and applies a portion of its weight. While the force of gravity can pull the HMD module 110 downward onto the nose and cheeks of the user, the tilt strap 260 can tilt the HMD module 110 with forces that include at least a downward component. The tension in the tilt strap 260 can be decreased to reduce the tilt that urges the HMD module 110 against the forehead of the user. Such operations can help alleviate forces on the nose and cheeks of the user and distribute forces as desired to the forehead of the user. Such a distribution can help enhance a user's comfort and facilitate use of the head-mountable device 100 for a greater duration of time than would otherwise be comfortable for the user.

As shown, the support strap 240 can extend from support strap engagement elements 242 positioned at a lower location (e.g., below a horizontal plane 250) on the HMD module 110 and about an upper region (e.g., above a horizontal plane 250) of the head 10 of the user to provide forces with an upward component. In contrast, the tilt strap 260 can extend from tilt strap engagement elements 262 positioned at an upper location (e.g., above a horizontal plane 250) on the HMD module 110 and about a lower region (e.g., below a horizontal plane 250) of the head 10 of the user to provide forces with a downward component and/or torque to tilt the HMD module 110 toward or away from the forehead of the user's head 10. The position of the tilt strap engagement elements 262 can facilitate the application of torque to provide the desired tilt. As such, the support strap 240 and the tilt strap 260 can cross each other at least one along their lengths and/or as they extend about the head 10 of the user.

As further shown in FIGS. 2 and 3, the head securement element 200 can include a pad 210. The support strap 240 and/or the tilt strap 260 can extend over the pad 210. As such, the pad 210 can provide a protective layer between the straps and the head 10 of the user. The pad 210 can provide at least some support to retain their HMD module 110 on the head 10 of the user. Nonetheless, the pad 210 can have a different composition and/or structure than either of the straps. The pad 210 can be stretchable to comfortably provide tension about the head 10 of the user. For example, the pad 210 can stretch and/or bend with greater ease than the support strap 240 and/or the tilt strap 260. By further example, the support strap 240 and/or the tilt strap 260 can provide minimal or no elongation in response to tension, whereas the pad 210 can stretch more than the pad 210. The pad 210 can optionally extend from ends of the arms 190. The pad 210 can be substantially flexible, bendable, and/or stretchable. The arms 190 and the pad 210 can be coupled together by one or more of various mechanisms. For example, mechanisms such as fused materials, weaves, knits, braids, overmolding, co-molding, adhesive, and/or combinations thereof can be included to couple and/or secure the arms 190 and the pad 210 together. Alternatively, the pad 210 can be omitted.

Figure 4:
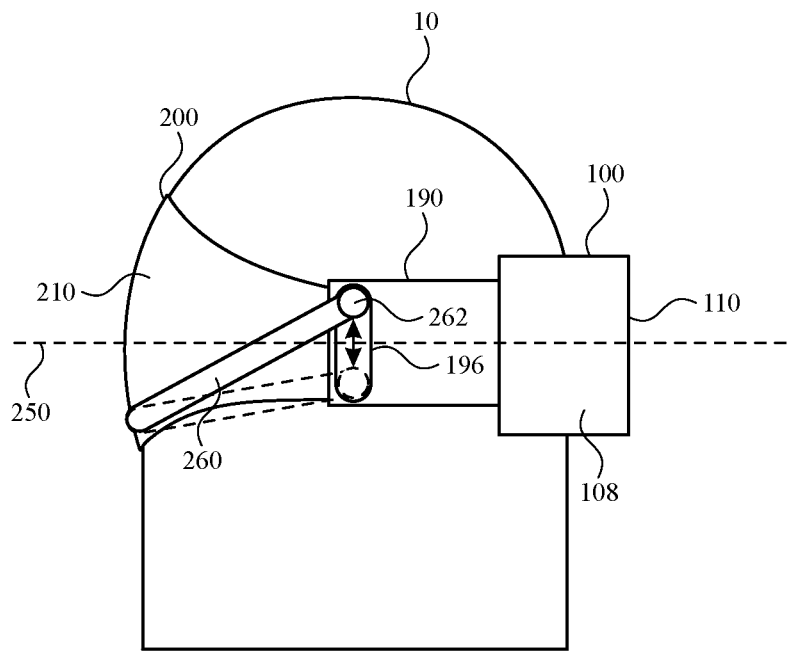
FIG. 4 illustrates a side view of a head-mountable device on a head of a user, according to some embodiments of the present disclosure.
Figure 5:
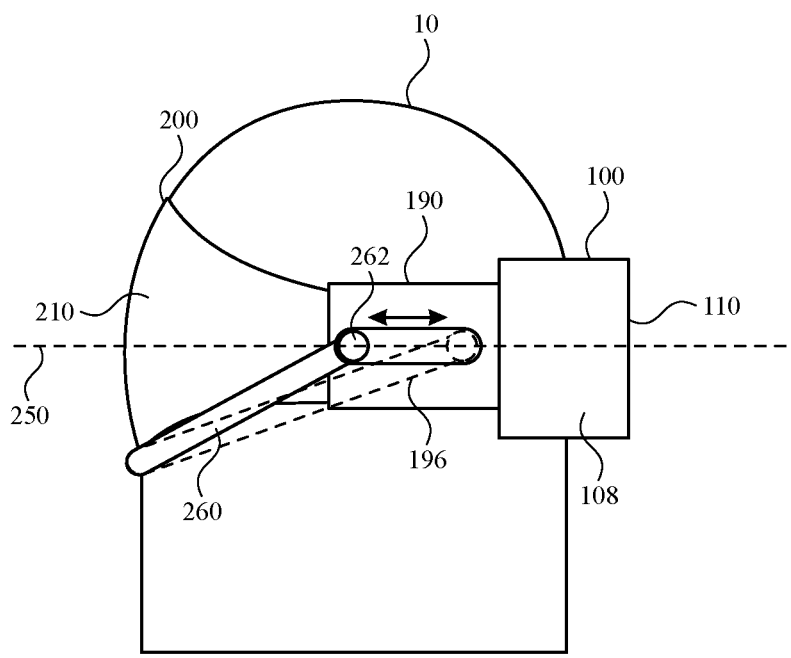
FIG. 5 illustrates a side view of a head-mountable device on a head of a user, according to some embodiments of the present disclosure.

Referring now to FIGS. 4 and 5, one or more straps can connect to an HMD module at adjustable locations. For example, as shown in FIG. 4, a tilt strap 260 can extend from the HMD module 110 and extend about a lower portion of the head 10 of the user. While the tilt strap 260 is shown extending from the arm 190, it will be understood that the tilt strap 260 can extend from the frame 108 or another portion of the HMD module 110.

The tilt strap 260 can include tilt strap engagement elements 262 that are coupled to the HMD module 110 (e.g., at the arms 190, the frame 108, etc.) at locations that can be altered. For example, the HMD module 110 (e.g., at the arms 190, the frame 108, etc.) can include HMD module engagement elements 196. The tilt strap engagement element 262 can securely and adjustably engage the corresponding HMD module engagement elements 196 in one of a variety of positions and/or orientations with respect to the tilt strap engagement element 262. For example, the tilt strap engagement element 262 can move toward, away from, across, and/or to different sides of the horizontal plane 250.

Adjustments between the tilt strap engagement element 262 and the HMD module engagement elements 196 can change the location at which the tilt strap 260 applies forces to the HMD module 110. For example, a force applied above the horizontal plane 250 will generate a different torque than the same force applied below the horizontal plane 250.

Additionally or alternatively, adjustments between the tilt strap engagement element 262 and the HMD module engagement elements 196 can change the relative orientation of the tilt strap 260 with respect to the HMD module 110. For example, forces applied in different directions (e.g., forming different angles with respect to the HMD module 110) will generate different torques.

Additionally or alternatively, adjustments between the tilt strap engagement element 262 and the HMD module engagement elements 196 can change the magnitude of forces applied to the HMD module 110. For example, by moving the tilt strap engagement elements 262 away from the rear of the user's head, the forces applied to the HMD module 110 by the tilt strap 262 can be increased. Accordingly, the location of the tilt strap engagement elements 262 can be adjusted to determine how forces are distributed on the face of the user.

The interface of the tilt strap engagement elements 262 and the HMD module engagement elements 196 can include one or more of a variety of engagement mechanisms. For example, the tilt strap engagement elements 262 and/or the HMD module engagement elements 196 can include slides, rails, channels, pins, openings, snaps, detents, latches, catches, magnets, friction couplings, locks, flexures, and the like. Adjustments between the tilt strap engagement elements 262 and the HMD module engagement elements 196 can be manual (e.g., by the user) and/or automated (e.g., controlled by the HMD module 110). For example, a sensor (e.g., force sensor) of the HMD module 110 can provide an output that provides a basis for making adjustments to the distribution of forces on the face of the user.

As shown in FIG. 5, the HMD module engagement elements 196 and/or the tilt strap engagement elements 262 can facilitate adjustments and/or movements in one or more of a variety of directions. For example, the HMD module engagement elements 196 can facilitate movement of the tilt strap engagement elements 262 along and/or parallel to the horizontal plane 250. It will be understood that movement and/or adjustments in any one or more directions can be facilitated. Accordingly, Adjustments between the tilt strap engagement element 262 and the HMD module engagement elements 196 can change the location at which the tilt strap 260 applies forces to the HMD module 110. For example, a force applied above the horizontal plane 250 will generate a different torque than the same force applied below the horizontal plane 250. As described herein, such adjustments can change the location, direction, and/or magnitude of forces applied to the HMD module 110.

Figure 6:
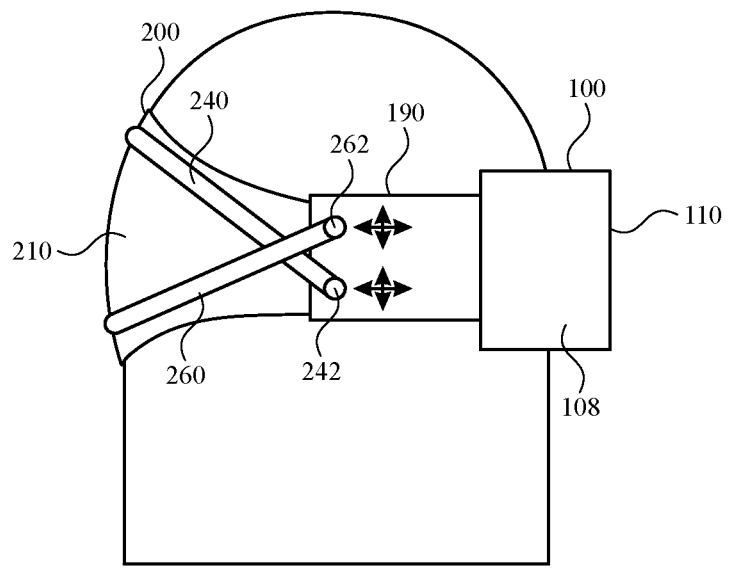
FIG. 6 illustrates a side view of a head-mountable device on a head of a user, according to some embodiments of the present disclosure.
Figure 7:
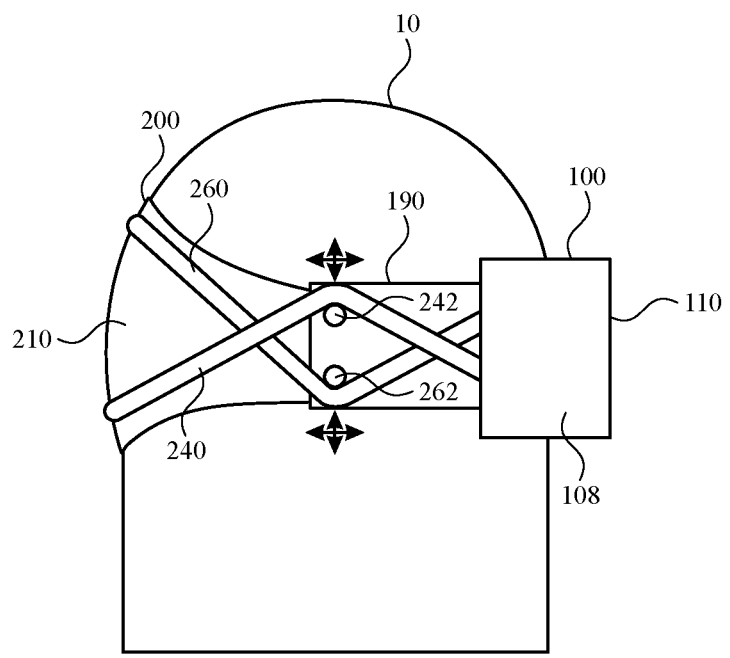
FIG. 7 illustrates a rear view of a head securement element of the head-mountable device of FIG. 6, according to some embodiments of the present disclosure.

Referring now to FIGS. 6 and 7, multiple straps can be independently adjusted to provide a custom fit for the user. Such adjustments can include locations of couplings to the HMD module.

As shown in FIG. 6, the support strap 240 can be coupled to the HMD module 110 by the support strap engagement element 242, and the tilt strap 260 can be coupled to the HMD module 110 by the tilt strap engagement element 262. Each of the support strap engagement element 242 and the tilt strap engagement element 262 can be independently adjustable, such that the location at which each couples to the HMD module 110 is adjustable. Such adjustments, facilitated for example by HMD module engagement elements, can change the location, direction, and/or magnitude of forces applied to the HMD module 110 by each of the support strap 240 and the tilt strap 260.

As shown in FIG. 7, the support strap 240 can be coupled to the HMD module 110 by the support strap engagement element 242, and the tilt strap 260 can be coupled to the HMD module 110 by the tilt strap engagement element 262. The coupling can include a sliding arrangement, in which each strap wraps around to facilitate sliding. The ends of the support strap 240 and the tilt strap 260 can be secured to the HMD module 110 at other locations (e.g., the frame 108). Accordingly, forces applied from tension in the support strap 240 and the tilt strap 260 can be applied, at least in part at the support strap engagement element 242 and the tilt strap engagement element 262.

The position of the support strap engagement element 242 and the tilt strap engagement element 262 can determine the location, direction, and/or magnitude of the applied forces. Each of the support strap engagement element 242 and the tilt strap engagement element 262 can be independently adjustable, such that the location at which each couples (e.g., contacts, wraps around, slides over) to the HMD module 110 is adjustable. Such adjustments can change the location, direction, and/or magnitude of forces applied to the HMD module 110 by each of the support strap 240 and the tilt strap 260.

Figure 8:
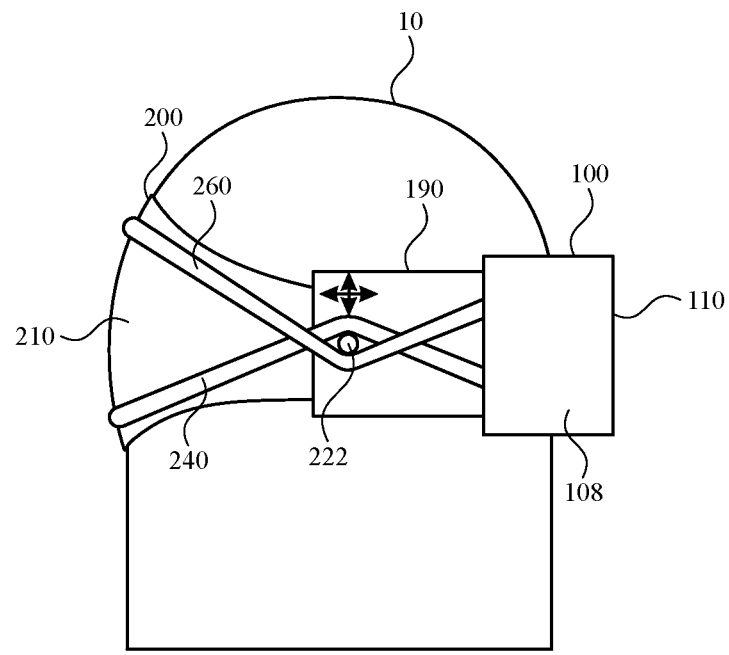
FIG. 8 illustrates a side view of a head-mountable device on a head of a user, according to some embodiments of the present disclosure.
Figure 9:
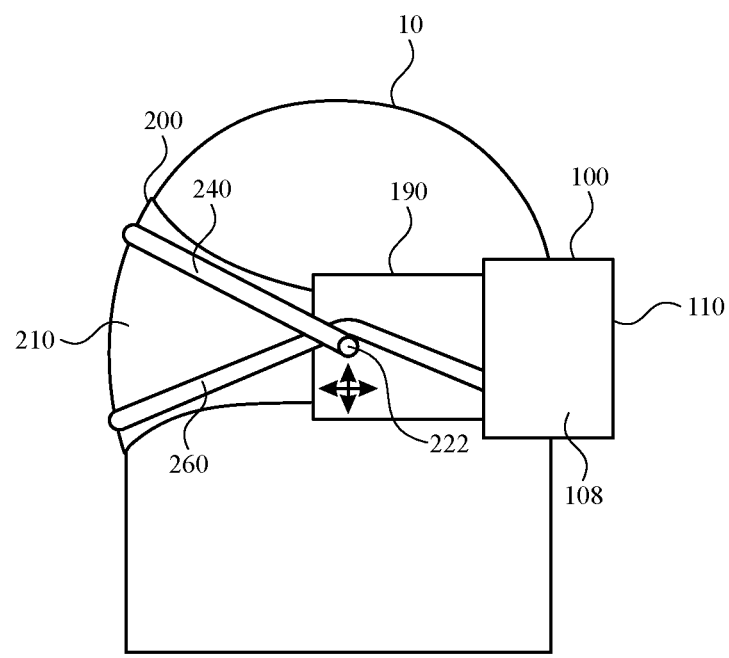
FIG. 9 illustrates a side view of a head-mountable device on a head of a user, according to some embodiments of the present disclosure.

Referring now to FIGS. 8 and 9, multiple straps can be adjusted simultaneously to provide a custom fit for the user. Such adjustments can include a location of a coupling to the HMD module.

As shown in FIG. 8, the support strap 240 and the tilt strap 260 can be coupled to the HMD module 110 by a strap engagement element 222. The coupling can include a sliding arrangement, in which each strap wraps around to facilitate sliding. The ends of the support strap 240 and the tilt strap 260 can be secured to the HMD module 110 at other locations (e.g., the frame 108). Accordingly, forces applied from tension in the support strap 240 and the tilt strap 260 can be applied, at least in part at the strap engagement element 222.

The position of the strap engagement element 222 can determine the location, direction, and/or magnitude of the applied forces. Each of the support strap engagement element 242 and the tilt strap engagement element 262 can be simultaneously adjusted, such that the location at which each couples (e.g., contacts, wraps around, slides over) to the HMD module 110 is changed. Such adjustments can change the location, direction, and/or magnitude of forces applied to the HMD module 110 by each of the support strap 240 and the tilt strap 260.

As shown in FIG. 9, the support strap 240 and the tilt strap 260 can be coupled to the HMD module 110 by a strap engagement element 222. While one strap (e.g., the support strap 240) is directly coupled to the strap engagement element 222, the other strap (e.g., the tilt strap 260) can be coupled with a sliding arrangement, in which each strap wraps around to facilitate sliding. The ends of the other strap (e.g., the tilt strap 260) can be secured to the HMD module 110 at other locations (e.g., the frame 108). Accordingly, forces applied from tension in the support strap 240 and the tilt strap 260 can be applied, at least in part at the strap engagement element 222. It will be understood that the arrangement of straps illustrated in FIG. 9 can be swapped or otherwise altered.

The position of the strap engagement element 222 can determine the location, direction, and/or magnitude of the applied forces. Each of the support strap engagement element 242 and the tilt strap engagement element 262 can be simultaneously adjusted, such that the location at which each couples (e.g., contacts, wraps around, slides over) to the HMD module 110 is changed. Such adjustments can change the location, direction, and/or magnitude of forces applied to the HMD module 110 by each of the support strap 240 and the tilt strap 260. It will be understood that such changes can occur differently for each of the support strap 240 and the tilt strap 260 based on the different types of coupling to the strap engagement element 222. For example, a direct coupling can result in more directly corresponding changes, whereas the sliding coupling can results in a reduced effect due to the extension of the strap beyond the strap engagement element 222.

Figure 10:
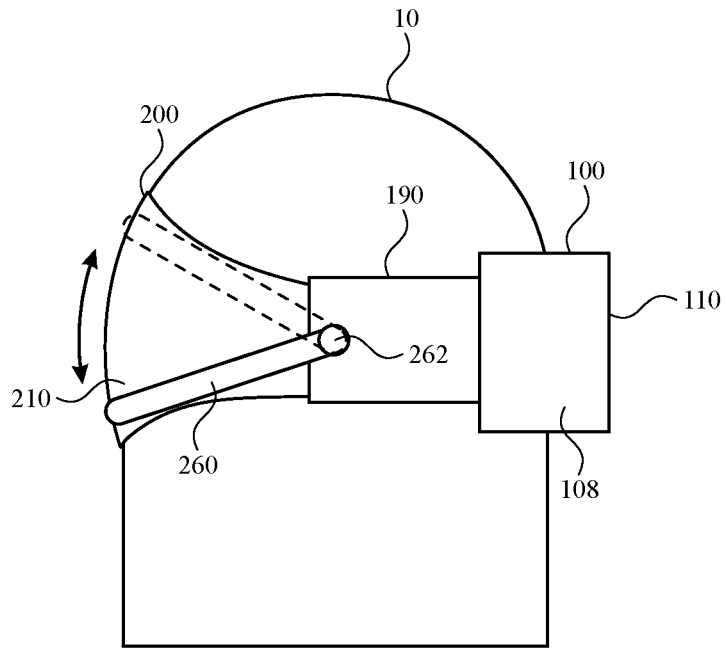
FIG. 10 illustrates a side view of a head-mountable device on a head of a user, according to some embodiments of the present disclosure.
Figure 11:
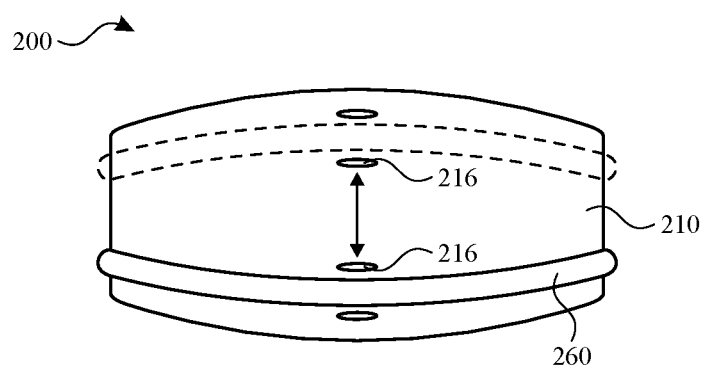
FIG. 11 illustrates a side view of a head-mountable device on a head of a user, according to some embodiments of the present disclosure.

Referring now to FIGS. 10 and 11, a strap can have a position on the rear of the user's head that is adjustable. Such adjustments can alter the fit of the head-mountable device on the head of the user.

As shown in FIG. 10, a tilt strap 260 can be coupled to the HMD module 110 by a tilt strap engagement elements 262. The tilt strap 260 can extend around the head 10 of the user at one of multiple locations. The selection of locations can determine aspects of the forces applied from tension in the tilt strap 260.

As shown in FIG. 11, the tilt strap 260 can be adjusted with respect to a pad 210 of the head securement element 200. The pad 210 can include pad engagement elements 216. The interface of the tilt strap 260 and the pad engagement elements 216 can include one or more of a variety of engagement mechanisms. For example, the tilt strap 260 and/or the pad engagement elements 216 can include slides, rails, channels, pins, openings, snaps, detents, latches, catches, magnets, friction couplings, locks, flexures, and the like. As shown in FIG. 11, multiple, discrete pad engagement elements 216 can be provided to receive the tilt strap 260 thereat. Adjustments between the tilt strap 260 and the pad engagement elements 216 can be manual (e.g., by the user) and/or automated (e.g., controlled by the HMD module 110). For example, a sensor (e.g., force sensor) of the HMD module 110 can provide an output that provides a basis for making adjustments to the distribution of forces on the face of the user.

The position of the tilt strap 260 can determine the location, direction, and/or magnitude of the applied forces. For example, adjustment of the tilt strap 260 with respect to the pad engagement elements 216 can alter an orientation of the tilt strap 260 with respect to the HMD module 110 (e.g., an angle formed at a location of coupling to the HMD module 110). As such, the direction of the forces applied (e.g., having an upward or downward components) can be controlled to determine how forces on the face of the user are distributed.

Figure 12:
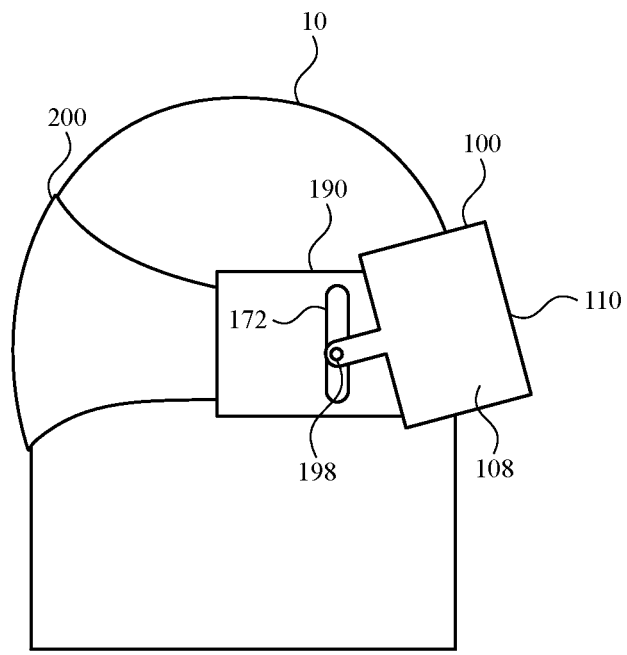
FIG. 12 illustrates a side view of a head-mountable device on a head of a user, according to some embodiments of the present disclosure.
Figure 13:
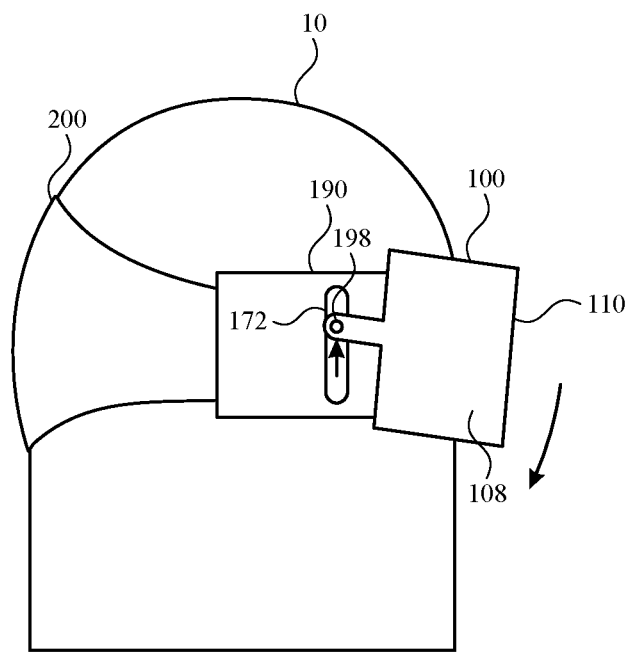
FIG. 13 illustrates a side view of a head-mountable device on a head of a user, according to some embodiments of the present disclosure.

Referring now to FIGS. 12 and 13, an HMD module can be adjustable with respect to a head securement element to control the distribution of forces applied to the face of the user. Such adjustments can alter the fit of the head-mountable device on the head of the user.

As shown in FIGS. 12 and 13, an HMD module 110 can include HMD module engagement elements 198 that are coupled to arm engagement elements 172. For example, the HMD module 110. The HMD module engagement elements 198 can securely and adjustably engage the corresponding arm engagement elements 172 in one of a variety of positions and/or orientations with respect to the HMD module engagement elements 198.

Adjustments between the HMD module engagement elements 198 and the arm engagement elements 172 can change the location at which the head securement element 200 applies forces to the HMD module 110. Additionally or alternatively, adjustments between the HMD module engagement elements 198 and the arm engagement elements 172 can change the relative orientation of the arms 190 with respect to the HMD module 110. Additionally or alternatively, adjustments between the HMD module engagement elements 198 and the arm engagement elements 172 can change the magnitude of forces applied to the HMD module 110.

The interface of the HMD module engagement elements 198 and the arm engagement elements 172 can include one or more of a variety of engagement mechanisms. For example, the HMD module engagement elements 198 and/or the arm engagement elements 172 can include slides, rails, channels, pins, openings, snaps, detents, latches, catches, magnets, friction couplings, locks, flexures, and the like. Adjustments between the HMD module engagement elements 198 and the arm engagement elements 172 can be manual (e.g., by the user) and/or automated (e.g., controlled by the HMD module 110). For example, a sensor (e.g., force sensor) of the HMD module 110 can provide an output that provides a basis for making adjustments to the distribution of forces on the face of the user.

Figure 14:
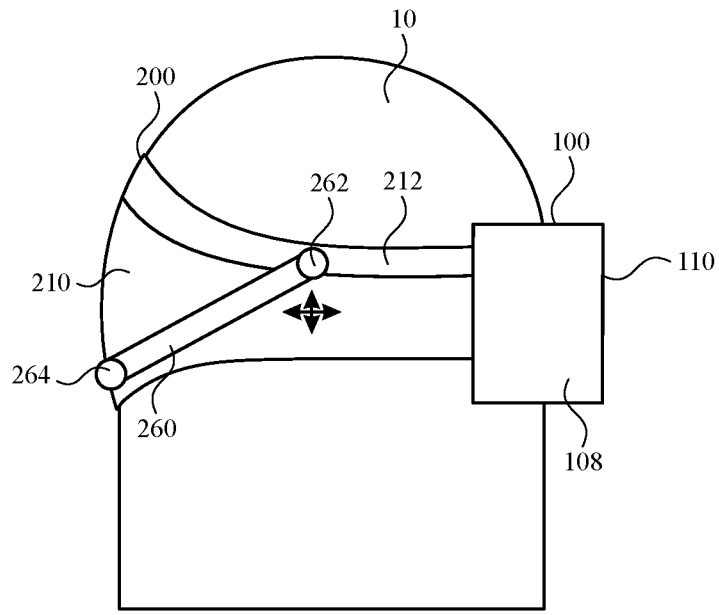
FIG. 14 illustrates a side view of a head-mountable device on a head of a user, according to some embodiments of the present disclosure.

Referring now to FIG. 14, at least one component can provide consistent support and at least one strap can be adjusted to provide a custom fit for the user.

As shown in FIG. 14, the head securement element 200 can include a pad 210 and a support section 212. The support section 212 can extend about an upper portion of the head 10 of the user. The support section 212 can be more rigid and/or less flexible and/or stretchable than the pad 210. In some examples, both the pad 210 and the support section 212 can extend from each of opposing sides of the HMD module 110 (e.g., at the frame 108). The support section 212 can extend continuously to support the weight of the HMD module 110. The support section 212 can be integrally formed with the pad 210, such that both are co-extensive.

As further shown in FIG. 14, a tilt strap 260 can extend from the support section 212 and extend about a lower portion of the head 10 of the user. The tilt strap 260 can include tilt strap engagement elements 262 that are coupled to the support section 212 at corresponding second locations. The tilt strap engagement elements 262 can optionally facilitate movement and/or rotation of the tilt strap 260 relative to the support section 212, as described further herein. Such adjustments, facilitated for example by the tilt strap engagement elements 262, can change the location, direction, and/or magnitude of forces applied to the support section 212 by the tilt strap 260.

Additionally or alternatively, the tilt strap 260 can include a tilt strap tensioning element 264 configured to adjust tension in the tilt strap 260. The tilt strap tensioning element 264 can be operated to alter an effective length of the tilt strap 260 (e.g., the length between the tilt strap engagement elements 262) and/or to adjust the tension in the tilt strap 260. When tension is increased, the HMD module 110 can be tilted (e.g., rotated) about a fulcrum, such as regions of the user's face (e.g., nose and cheeks) on which the HMD module 110 rests and applies a portion of its weight. While the force of gravity can pull the HMD module 110 downward onto the nose and cheeks of the user, the tilt strap 260 can tilt the HMD module 110 with forces that include at least a downward component. The tension in the tilt strap 260 can be decreased to reduce the tilt that urges the HMD module 110 against the forehead of the user. Such operations can help alleviate forces on the nose and cheeks of the user and distribute forces as desired to the forehead of the user.

Figure 15:
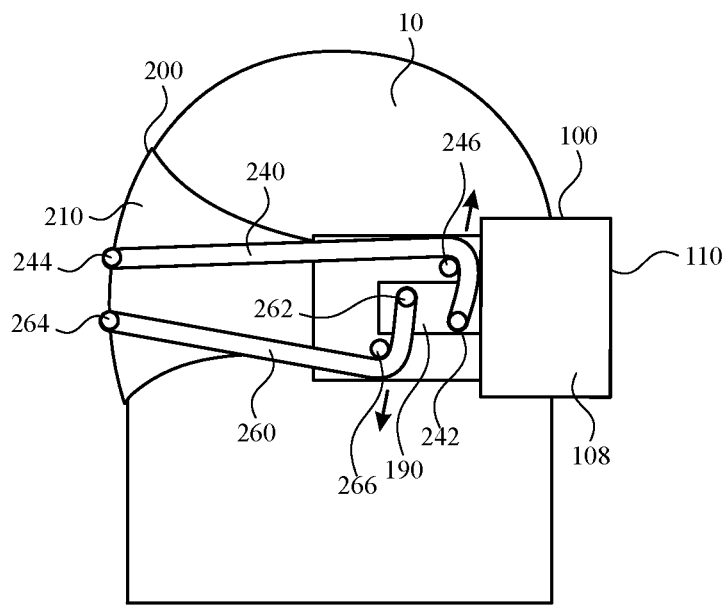
FIG. 15 illustrates a side view of a head-mountable device on a head of a user, according to some embodiments of the present disclosure.

Referring now to FIG. 15, multiple straps can be adjusted to provide a custom fit for the user.

As shown in FIG. 15, a support strap 240 can extend from the HMD module 110 and extend about an upper portion of the head 10 of the user. While the support strap 240 is shown extending from the arm 190, it will be understood that the support strap 240 can extend from the frame 108 or another portion of the HMD module 110. The support strap 240 can include support strap engagement elements 242 that are coupled to the HMD module 110 (e.g., at the arms 190, the frame 108, etc.) at corresponding first locations. The support strap engagement elements 242 can optionally facilitate movement and/or rotation of the support strap 240 relative to the HMD module 110, as described further herein.

The support strap 240 can include a support strap tensioning element 244 configured to adjust tension in the support strap 240. While the support strap tensioning element 244 is shown at a rear portion of the head securement element 200, it will be understood that the support strap tensioning element 244 can be at any portion of the support strap 240, such as at a location of connection to the HMD module 110 (e.g., at the arms 190, the frame 108, etc.). The support strap tensioning element 244 can be operated to alter an effective length of the support strap 240 (e.g., the length between the support strap engagement elements 242). The support strap tensioning element 244 can be operated to adjust the tension in the support strap 240. When tension is increased, the support strap 240 can be pulled around an additional support strap engagement element 246 coupled to the pad 210 at a location that is above the support strap engagement element 242. For example, the support strap 240 can slide along a portion of the additional support strap engagement element 246. The position of the additional support strap engagement element 246 relative to the support strap engagement element 242 can determine a direction of the forces applied based on the tension in the support strap 240. Accordingly, a distance between the support strap engagement elements 242 and the additional support strap engagement element 246 can be adjusted, with corresponding changes in the HMD module 110 being made.

Additionally or alternatively, the support strap engagement elements 242 can be moved with respect to the HMD module 110 at a location of connection (e.g., at the arms 190, the frame 108, etc.). Additionally or alternatively, the additional support strap engagement element 246 can be moved with respect to the head securement element 200 at a location of connection (e.g., the pad 210, etc.). Such movements can alter a distance between the between the support strap engagement elements 242 and the additional support strap engagement element 246 and provide corresponding changes in the position and/or orientation of the HMD module 110.

As further shown in FIG. 15, a tilt strap 260 can extend from the HMD module 110 and extend about a lower portion of the head 10 of the user. While the tilt strap 260 is shown extending from the arm 190, it will be understood that the tilt strap 260 can extend from the frame 108 or another portion of the HMD module 110. The tilt strap 260 can include tilt strap engagement elements 262 that are coupled to the HMD module 110 (e.g., at the arms 190, the frame 108, etc.) at corresponding second locations. The tilt strap engagement elements 262 can optionally facilitate movement and/or rotation of the tilt strap 260 relative to the HMD module 110, as described further herein.

The tilt strap 260 can include a tilt strap tensioning element 264 configured to adjust tension in the tilt strap 260. While the tilt strap tensioning element 264 is shown at a rear portion of the head securement element 200, it will be understood that the tilt strap tensioning element 264 can be at any portion of the tilt strap 260, such as at a location of connection to the HMD module 110 (e.g., at the arms 190, the frame 108, etc.). The tilt strap tensioning element 264 can be operated to alter an effective length of the tilt strap 260 (e.g., the length between the tilt strap engagement elements 262). The tilt strap tensioning element 264 can be operated to adjust the tension in the tilt strap 260. When tension is increased, the support strap 240 can be pulled around an additional tilt strap engagement element 266 coupled to the pad 210 at a location that is below the tilt strap engagement elements 262. For example, the tilt strap 260 can slide along a portion of the additional tilt strap engagement element 266. The position of the additional tilt strap engagement element 266 relative to the tilt engagement element 262 can determine a direction of the forces applied based on the tension in the tilt strap 260. Accordingly, a distance between the tilt strap engagement elements 262 and the additional tilt strap engagement element 266 can be adjusted, with corresponding changes in the HMD module 110 being made.

Additionally or alternatively, the tilt strap engagement elements 262 can be moved with respect to the HMD module 110 at a location of connection (e.g., at the arms 190, the frame 108, etc.). Additionally or alternatively, the additional tilt strap engagement element 266 can be moved with respect to the head securement element 200 at a location of connection (e.g., the pad 210, etc.). Such movements can alter a distance between the between the tilt strap engagement elements 262 and the additional tilt strap engagement element 266 and provide corresponding changes in the position and/or orientation of the HMD module 110.

Figure 16:
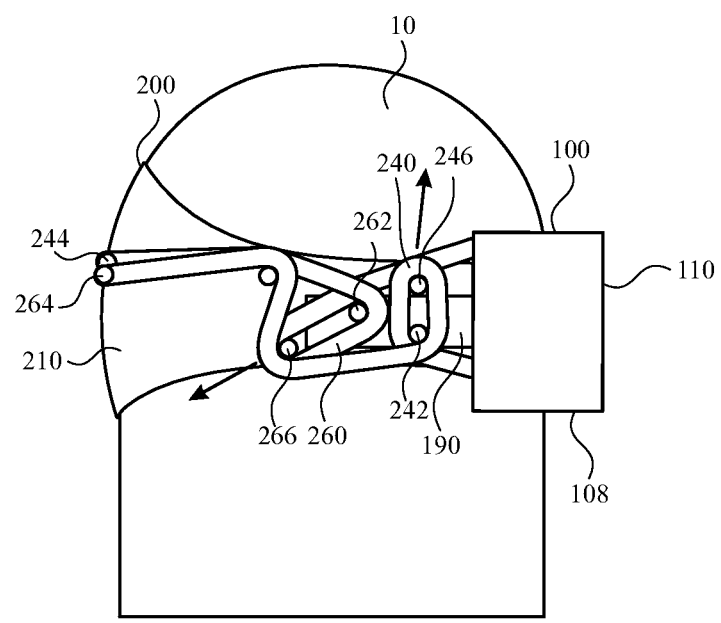
FIG. 16 illustrates a side view of a head-mountable device on a head of a user, according to some embodiments of the present disclosure.

Referring now to FIG. 16, multiple straps can be adjusted to provide a custom fit for the user.

As shown in FIG. 16, a support strap 240 can extend from the HMD module 110 and extend about an upper portion of the head 10 of the user. While the support strap 240 is shown extending from the arm 190, it will be understood that the support strap 240 can extend from the frame 108 or another portion of the HMD module 110. The support strap 240 can wrap at least partially around support strap engagement elements 242 that are coupled to the HMD module 110 (e.g., at the arms 190, the frame 108, etc.) at corresponding first locations. The support strap 240 can also wrap at least partially around additional support strap engagement element 246 coupled to the pad 210 at a location that is above the support strap engagement element 242. The support strap 240 can form a loop that surrounds both a support strap engagement element 242 and an additional support strap engagement element 246.

The support strap 240 can include a support strap tensioning element 244 configured to adjust tension in the support strap 240. While the support strap tensioning element 244 is shown at a rear portion of the head securement element 200, it will be understood that the support strap tensioning element 244 can be at any portion of the support strap 240, such as at a location of connection to the HMD module 110 (e.g., at the arms 190, the frame 108, etc.). The support strap tensioning element 244 can be operated to alter an effective length of the support strap 240 (e.g., the length between the support strap engagement elements 242). The support strap tensioning element 244 can be operated to adjust the tension in the support strap 240. When tension is increased, the support strap 240 can be pulled around the support strap engagement element 242 and the additional support strap engagement element 246. For example, the support strap 240 can slide along portions of the support strap engagement element 242 and the additional support strap engagement element 246. The position of the additional support strap engagement element 246 relative to the support strap engagement element 242 can determine a direction of the forces applied based on the tension in the support strap 240. Accordingly, a distance between the support strap engagement element 242 and the additional support strap engagement element 246 can be adjusted, with corresponding changes in the HMD module 110 being made.

Additionally or alternatively, the support strap engagement elements 242 can be moved with respect to the HMD module 110 at a location of connection (e.g., at the arms 190, the frame 108, etc.). Additionally or alternatively, the additional support strap engagement element 246 can be moved with respect to the head securement element 200 at a location of connection (e.g., the pad 210, etc.). Such movements can alter a distance between the between the support strap engagement elements 242 and the additional support strap engagement element 246 and provide corresponding changes in the position and/or orientation of the HMD module 110.

As further shown in FIG. 16, a tilt strap 260 can extend from the HMD module 110 and extend about a lower portion of the head 10 of the user. While the tilt strap 260 is shown extending from the arm 190, it will be understood that the tilt strap 260 can extend from the frame 108 or another portion of the HMD module 110. The tilt strap 260 can wrap at least partially around tilt strap engagement elements 262 that are coupled to the HMD module 110 (e.g., at the arms 190, the frame 108, etc.) at corresponding first locations. The tilt strap 260 can also wrap at least partially around additional tilt strap engagement element 266 coupled to the pad 210 at a location that is below the tilt strap engagement element 262. The tilt strap 260 can form a loop that surrounds both a tilt strap engagement element 262 and an additional tilt strap engagement element 266.

The tilt strap 260 can include a tilt strap tensioning element 264 configured to adjust tension in the tilt strap 260. While the tilt strap tensioning element 264 is shown at a rear portion of the head securement element 200, it will be understood that the tilt strap tensioning element 264 can be at any portion of the tilt strap 260, such as at a location of connection to the HMD module 110 (e.g., at the arms 190, the frame 108, etc.). The tilt strap tensioning element 264 can be operated to alter an effective length of the tilt strap 260 (e.g., the length between the tilt strap engagement elements 262). The tilt strap tensioning element 264 can be operated to adjust the tension in the tilt strap 260. When tension is increased, the tilt strap 260 can be pulled around the tilt strap engagement element 262 and the additional tilt strap engagement element 266. For example, the tilt strap 260 can slide along portions of the tilt strap engagement element 262 and the additional tilt strap engagement element 266. The position of the additional tilt strap engagement element 266 relative to the tilt strap engagement element 262 can determine a direction of the forces applied based on the tension in the tilt strap 260. Accordingly, a distance between the tilt strap engagement element 262 and the additional tilt strap engagement element 266 can be adjusted, with corresponding changes in the HMD module 110 being made.

Additionally or alternatively, the tilt strap engagement elements 262 can be moved with respect to the HMD module 110 at a location of connection (e.g., at the arms 190, the frame 108, etc.). Additionally or alternatively, the additional tilt strap engagement element 266 can be moved with respect to the head securement element 200 at a location of connection (e.g., the pad 210, etc.). Such movements can alter a distance between the between the tilt strap engagement elements 262 and the additional tilt strap engagement element 266 and provide corresponding changes in the position and/or orientation of the HMD module 110.

Figure 17:
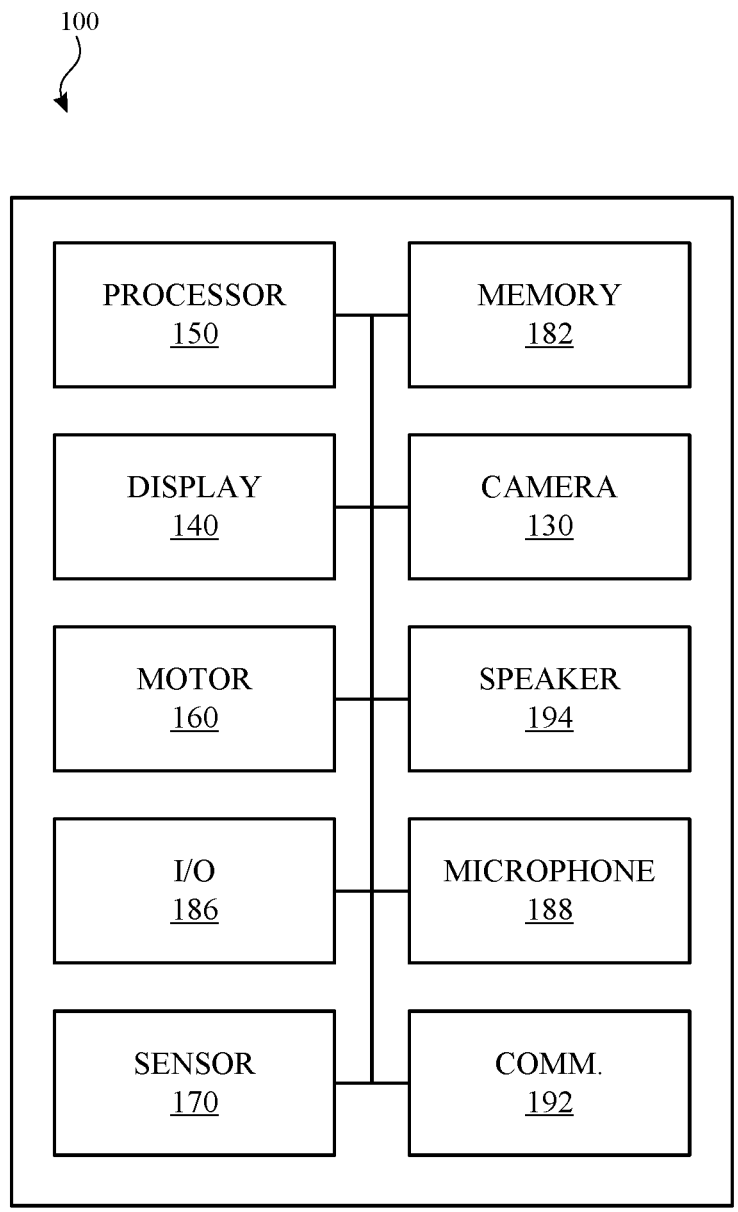
FIG. 17 illustrates a block diagram of a head-mountable device, in accordance with some embodiments of the present disclosure.

Referring now to FIG. 17, components of the head-mountable device can be operably connected to provide the performance described herein. FIG. 17 shows a simplified block diagram of an illustrative head-mountable device 100 in accordance with one embodiment of the invention. It will be appreciated that components described herein can be provided on one, some, or all of an HMD module, a face engagement module, and/or a head securement element. It will be understood that additional components, different components, or fewer components than those illustrated may be utilized within the scope of the subject disclosure.

As shown in FIG. 17, the head-mountable device 100 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display element 140 for close up viewing. The optical subassembly can include one or more lenses, mirrors, or other optical devices.

The head-mountable device 100 can include adjustment control components, such as a motor 160, an actuator, and the like for moving components to a desired relative position, orientation, and/or configuration as described herein.

The head-mountable device 100 can include one or more sensors 170, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include the speakers 194 as described herein. The speakers 194 can be operably connected to the processor 150 for control of speaker output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery or other power source, which can charge and/or power components of the head-mountable device 100. The battery can also charge and/or power components connected to the head-mountable device 100.

Accordingly, embodiments of the present disclosure provide a head-mountable device with a head securement element allows a user to adjust both the magnitude, location, and direction of forces applied to the face of the user. Examples of adjustment mechanisms described herein allow a user to control the tilt of the head-mountable device relative to a head securement element, as well as the tightness of the head securement element. Accordingly, the user can select a fit that distributes forces widely, maximizes comfort, allows the user to enjoy the head-mountable device for longer durations of time.

Various examples of aspects of the disclosure are described below as clauses for convenience. These are provided as examples, and do not limit the subject technology.

Clause A: a head-mountable device comprising: an HMD module comprising: a frame; and a display element supported by the frame; a head securement element comprising: a support strap coupled to the HMD module at first locations on opposing sides of the HMD module; a support strap tensioning element configured to adjust tension of the support strap; a tilt strap coupled to the HMD module at second locations on the opposing sides of the HMD module; and a tilt strap tensioning element configured to adjust tension of the tilt strap.

Clause B: a head-mountable device comprising: an HMD module comprising: a frame; a display element supported by the frame; and HMD engagement elements; a head securement element comprising: a strap having strap engagement elements coupled to the HMD module via the HMD engagement elements, wherein the strap engagement elements are movable relative to the HMD module by adjusting an arrangement of the strap engagement elements and the HMD engagement elements.

Clause C: a head-mountable device comprising: an HMD module comprising: a frame; and a display element supported by the frame; a head securement element comprising: a pad coupled to opposing sides of the HMD module, the pad having a pad engagement element; a strap coupled to the opposing sides of the HMD module, wherein the strap is movable relative to the pad by adjusting an arrangement of the strap and the pad engagement element.

One or more of the above clauses can include one or more of the features described below. It is noted that any of the following clauses may be combined in any combination with each other, and placed into a respective independent clause, e.g., clause A, B, or C.

Clause 1: the HMD module further comprises: a camera configured to capture an image for output on the display element; a speaker; a microphone; and a sensor.

Clause 2: the support strap tensioning element is operable to adjust upward forces applied at the first locations; and the tilt strap tensioning element is operable to adjust downward forces applied at the second locations.

Clause 3: the support strap is coupled to the HMD module via support strap engagement elements at the first locations; the support strap tensioning element is configured to adjust the tension of the support strap by changing a length of the support strap between the support strap engagement elements.

Clause 4: the tilt strap is coupled to the HMD module via tilt strap engagement elements at the second locations; the tilt strap tensioning element is configured to adjust the tension of the tilt strap by changing a length of the tilt strap between the tilt strap engagement elements.

Clause 5: the support strap and the tilt strap are configured to cross each other while worn by a user.

Clause 6: a face engagement module coupled to the HMD module, the face engagement module being configured to engage a face of a user, provide a view to the display element, and block light from an external environment, the head securement element being coupled to the HMD module via the face engagement module.

Clause 7: the strap is a tilt strap; the strap engagement elements are tilt strap engagement elements; and the head-mountable device further comprises a support strap having support strap engagement elements coupled to the HMD module.

Clause 8: the support strap engagement elements are coupled to the HMD module via the HMD engagement elements, wherein the support strap engagement elements are movable relative to the HMD module by adjusting the arrangement of the support strap engagement elements and the HMD engagement elements.

Clause 9: the HMD engagement elements are first HMD engagement elements; and the support strap engagement elements are coupled to the HMD module via second HMD engagement elements, wherein the support strap engagement elements are movable relative to the HMD module by adjusting the arrangement of the support strap engagement elements and the second HMD engagement elements.

Clause 10: the support strap engagement elements are fixedly coupled to the HMD engagement elements; and the tilt strap engagement elements are slidably coupled around a portion of the HMD engagement elements.

Clause 11: the HMD module further comprises arms rigidly coupled to and extending away from opposing sides of the frame; and the HMD engagement elements are positioned on the arms.

Clause 12: the head securement element further comprises a pad coupled to the HMD module, the strap extending over the pad.

Clause 13: the pad engagement element comprises multiple pad engagement elements of the pad, the strap being securable to one of the multiple pad engagement elements, wherein an orientation of the strap relative to the HMD module is different for each of the multiple pad engagement elements.

Clause 14: the pad is configured to stretch under tension more than the strap is configured to stretch under the tension.

Clause 15: the strap is a tilt strap; the head securement element further comprises a support strap coupled to the opposing sides of the HMD module, wherein the support strap is movable relative to the pad by adjusting an arrangement of the support strap and the pad engagement element.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
    an HMD module defining a first side and a second side and comprising:
        a frame;
        a display element supported by the frame; and
        HMD engagement elements each positioned at either the first side or the second side of the HMD module;
    a head securement element comprising:
        a tilt strap having tilt strap engagement elements coupled to the HMD module via the HMD engagement elements on the first and second sides of the HMD module, wherein the tilt strap engagement elements are movable relative to the HMD module by adjusting an arrangement of the tilt strap engagement elements and the HMD engagement elements; and
        a support strap and having support strap engagement elements coupled to the HMD module at the first and second sides of the HMD module, the support strap crossing the tilt strap at least twice between the first and second sides of the HMD module.

2. The head-mountable device of claim 1, wherein the support strap engagement elements are coupled to the HMD module via the HMD engagement elements, wherein the support strap engagement elements are movable relative to the HMD module by adjusting the arrangement of the support strap engagement elements and the HMD engagement elements.

3. The head-mountable device of claim 1, wherein:
    the HMD engagement elements are first HMD engagement elements; and
    the support strap engagement elements are coupled to the HMD module via second HMD engagement elements, wherein the support strap engagement elements are movable relative to the HMD module by adjusting the arrangement of the support strap engagement elements and the second HMD engagement elements.

4. The head-mountable device of claim 1, wherein:
the support strap engagement elements are fixedly coupled to the HMD engagement elements; and
the tilt strap engagement elements are slidably coupled around a portion of the HMD engagement elements.

5. The head-mountable device of claim 1, wherein:
the HMD module further comprises arms rigidly coupled to and extending away from opposing sides of the frame; and
the HMD engagement elements are positioned on the arms.

6. The head-mountable device of claim 1, wherein the head securement element further comprises a pad coupled to the HMD module, the support strap and the tilt strap each extending over the pad.

7. The head-mountable device of claim 1, further comprising a face engagement module coupled to the HMD module, the face engagement module being configured to engage a face of a user, provide a view to the display element, and block light from an external environment, the head securement element being coupled to the HMD module via the face engagement module.

8. The head-mountable device of claim 1, wherein:
the HMD module further comprises arms rigidly coupled to and extending away from opposing sides of the frame; and
the HMD engagement elements are positioned on the arms.

9. The head-mountable device of claim 1, wherein the head securement element further comprises a pad coupled to the HMD module, the tilt strap and the support strap extending over the pad.

10. The head-mountable device of claim 1, further comprising a face engagement module coupled to the HMD module, the face engagement module being configured to engage a face of a user, provide a view to the display element, and block light from an external environment, the head securement element being coupled to the HMD module via the face engagement module.

11. A head-mountable device comprising:
an HMD module defining a first side and a second side and comprising:
  a frame;
  a display element supported by the frame; and
  HMD engagement elements each positioned at either the first side or the second side of the HMD module;
a head securement element comprising:
  a tilt strap having tilt strap engagement elements coupled to the HMD module at the first and second sides of the HMD module; and
  a support strap and having support strap engagement elements coupled to the HMD module via the HMD engagement elements, wherein the support strap engagement elements are movable relative to the HMD module by adjusting an arrangement of the support strap engagement elements and the HMD engagement elements, the support strap crossing the tilt strap at least twice between the first and second sides of the HMD module.

12. The head-mountable device of claim 11, wherein:
the HMD engagement elements are first HMD engagement elements; and
the tilt strap engagement elements are coupled to the HMD module via second HMD engagement elements, wherein the tilt strap engagement elements are movable relative to the HMD module by adjusting the arrangement of the tilt strap engagement elements and the second HMD engagement elements.

13. The head-mountable device of claim 11, wherein:
the tilt strap engagement elements are fixedly coupled to the HMD engagement elements; and
the support strap engagement elements are slidably coupled around a portion of the HMD engagement elements.

* * * * *